United States Patent
Zhu et al.

(10) Patent No.: US 10,229,165 B2
(45) Date of Patent: Mar. 12, 2019

(54) METHOD AND DEVICE FOR PRESENTING TASKS

(71) Applicant: Xiaomi Inc., Beijing (CN)

(72) Inventors: Yifan Zhu, Beijing (CN); Lina Xu, Beijing (CN); Wankun Yang, Beijing (CN)

(73) Assignee: Xiaomi Inc., Beijing (CN)

( * ) Notice: Subject to any disclaimer, the term of this patent is extended or adjusted under 35 U.S.C. 154(b) by 288 days.

(21) Appl. No.: 15/209,587

(22) Filed: Jul. 13, 2016

(65) Prior Publication Data

US 2017/0017656 A1    Jan. 19, 2017

(30) Foreign Application Priority Data

Jul. 17, 2015    (CN) .......................... 2015 1 0424783

(51) Int. Cl.
*G06F 17/30*    (2006.01)
*G06F 3/048*    (2013.01)
*G06F 11/34*    (2006.01)
*G06F 9/48*    (2006.01)

(52) U.S. Cl.
CPC .......... *G06F 17/3053* (2013.01); *G06F 3/048* (2013.01); *G06F 9/4843* (2013.01); *G06F 11/3438* (2013.01); *G06F 17/30312* (2013.01); *G06F 17/30554* (2013.01); *G06F 11/3409* (2013.01); *G06F 2201/865* (2013.01)

(58) Field of Classification Search
CPC .......... G06F 17/3053; G06F 17/30312; G06F 17/30554; G06F 3/048; G06F 9/4843; G06F 11/3438; G06F 2201/865; G06F 11/3409

USPC ......................................................... 707/731
See application file for complete search history.

(56) References Cited

U.S. PATENT DOCUMENTS

| | | | |
|---|---|---|---|
| 6,324,546 B1 * | 11/2001 | Ka ....................... | G06F 11/3476 707/693 |
| 9,357,055 B2 * | 5/2016 | Bahn ..................... | G06F 3/0481 |
| 9,405,804 B1 * | 8/2016 | DiDomenico, III ........................ | G06Q 30/0204 |
| 9,703,458 B2 * | 7/2017 | Sasaki ................... | G06F 3/0484 |
| 2006/0085787 A1 * | 4/2006 | Breslaw ................. | G06F 9/485 718/100 |
| 2007/0083827 A1 | 4/2007 | Scott et al. | |

(Continued)

FOREIGN PATENT DOCUMENTS

| | | |
|---|---|---|
| CN | 102866831 A | 1/2013 |
| CN | 102946470 A | 2/2013 |

(Continued)

OTHER PUBLICATIONS

Zhang, Chunhui, et al., "Nihao: A Predictive Smartphone Application Launcher", MobiCASE 2012, Seattle, WA, Oct. 11-12, 2012, pp. 294-313.*

(Continued)

*Primary Examiner* — Robert Stevens
(74) *Attorney, Agent, or Firm* — Finnegan, Henderson, Farabow, Garrett & Dunner LLP

(57) ABSTRACT

A method for presenting tasks is provided. The method includes: acquiring an active index of each of tasks which are currently in operation in a terminal; ranking the tasks based on the active indices; and presenting the tasks according to a result of the ranking, wherein the active index is a frequency of the task being operated in the terminal.

15 Claims, 11 Drawing Sheets

(56) References Cited

U.S. PATENT DOCUMENTS

| | | | |
|---|---|---|---|
| 2009/0055829 A1* | 2/2009 | Gibson | G06F 9/4881 718/103 |
| 2010/0287275 A1* | 11/2010 | Inoue | G06F 9/453 709/224 |
| 2011/0107261 A1 | 5/2011 | Lin et al. | |
| 2013/0262475 A1* | 10/2013 | Barak | G06Q 10/06311 707/748 |
| 2013/0275915 A1 | 10/2013 | Wang | |
| 2014/0165070 A1* | 6/2014 | Persikov | G06F 9/4881 718/103 |
| 2015/0121306 A1 | 4/2015 | Fundament et al. | |
| 2015/0186010 A1 | 7/2015 | Huang et al. | |
| 2015/0193722 A1* | 7/2015 | Seaman | G06Q 10/109 705/7.15 |
| 2016/0004569 A1* | 1/2016 | Kim | G06F 9/5027 718/104 |
| 2016/0127511 A1* | 5/2016 | Zhang | G06F 11/3068 709/203 |

FOREIGN PATENT DOCUMENTS

| | | |
|---|---|---|
| CN | 102981859 A | 3/2013 |
| CN | 102999268 A | 3/2013 |
| CN | 103246427 A | 8/2013 |
| CN | 103309661 A | 9/2013 |
| CN | 103336654 A | 10/2013 |
| CN | 104346047 A | 2/2015 |
| CN | 105094608 A | 11/2015 |
| JP | 2006-029560 A | 2/2006 |
| JP | 2007-109200 A | 4/2007 |
| JP | 2011-065277 A | 3/2011 |
| JP | 2011-145780 A | 7/2011 |
| KR | 10-2014-0133159 A | 11/2014 |
| KR | 10-2015-0030563 A | 3/2015 |
| RU | 2477879 C2 | 3/2013 |
| WO | WO 2011/021908 A2 | 2/2011 |

OTHER PUBLICATIONS

Sears, Andrew, et al., "Split Menus: Effectively Using Selection Frequency to Organize Menus", ACM Transactions on Computer-Human Interaction, vol. 1, No. 1, Mar. 1994, pp. 27-51.*

Yan, Bo, et al., "AppJoy: Personalized Mobile Application Discovery", MobiSys '11, Bethesda, MD, Jun. 28-Jul. 1, 2011, pp. 113-126.*

Extended European Search Report for European Application No. 16179170.2-1954 dated Dec. 20, 2016, 7 pages.

Russian Office Action for Russian Application No. 2016117379/08 dated Jul. 27, 2017, 11 pages.

Russian Search Report for Russian Application No. 2016117379/08 dated Jul. 19, 2017, 4 pages.

English translation of International Search Report for PCT/CN2015/099720 dated Mar. 31, 2016, 2 pages.

* cited by examiner

METHOD AND DEVICE FOR PRESENTING TASKS

CROSS-REFERENCE TO RELATED APPLICATIONS

The present application is based upon and claims priority to Chinese Patent Application No. 201510424783.0, filed Jul. 17, 2015, the entire contents of which are incorporated herein by reference.

TECHNICAL FIELD

The present disclosure generally relates to the field of computer technology and, more particularly, to a method and device for presenting tasks.

BACKGROUND

The development of smart terminals has been rapid. As a result, smart terminals are equipped with an increasingly high level of software and hardware. The number of tasks that can be performed in a smart terminal in parallel has also increased. Generally, smart terminals have functions to allow a user to check all the tasks that are currently in operation. For example, when a user inputs a designated command, a smart terminal can present all the tasks, which are currently in operation, to the user. Generally, the smart terminal presents all the tasks, which are currently in operation, to the user in an order from the latest to the earliest according to when the tasks are started.

SUMMARY

According to a first aspect of the present disclosure, there is provided a method for presenting tasks. The method includes: acquiring an active index of each of tasks which are currently in operation in a terminal; ranking the tasks based on the active indices; and presenting the tasks according to a result of the ranking, wherein the active index is a frequency of the task being operated in the terminal.

According to another aspect of the present disclosure, there is provided a device for presenting tasks. The device includes: a processor; and a memory for storing instructions executable by the processor. The processor is configured to perform: acquiring an active index of each of tasks which are currently in operation in a terminal; ranking the tasks based on the active indices; and presenting the tasks according to a result of the ranking, wherein the active index is a frequency of the task being operated in the terminal.

According to another aspect of the present disclosure, there is provided a non-transitory computer-readable storage medium having stored therein instructions that, when executed by a processor of a terminal, cause the terminal to perform: acquiring an active index of each of tasks which are currently in operation in a terminal; ranking the tasks based on the active indices; and presenting the tasks according to a result of the ranking, wherein the active index is a frequency of the task being operated in the terminal.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Figure 1:
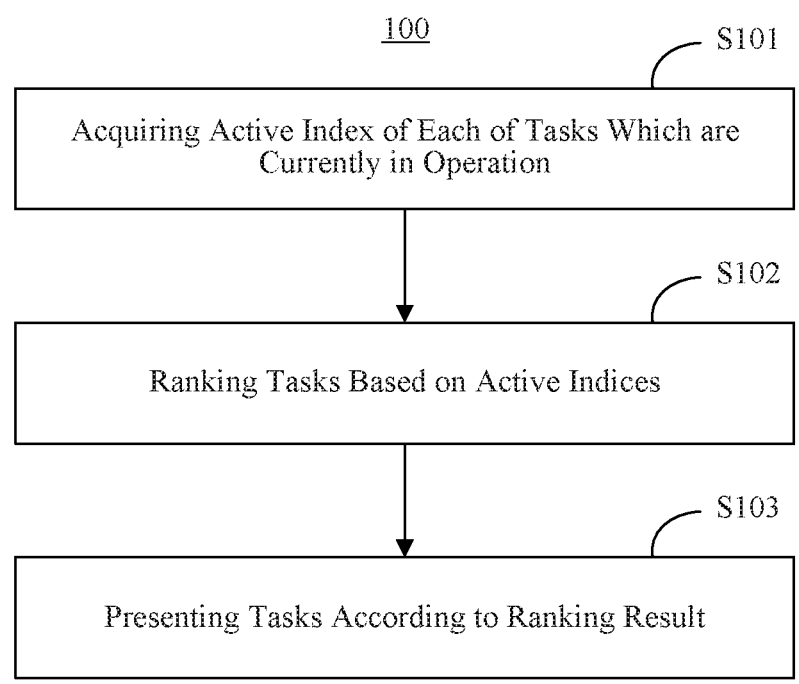
FIG. 1 is a flow chart illustrating a method for presenting tasks according to an exemplary embodiment of the present disclosure.

FIG. 1 is a flow chart illustrating a method 100 for presenting tasks according to an exemplary embodiment.

The method 100 for presenting tasks is performed by a terminal. The terminal can be a smart terminal which can perform multiple tasks in parallel, such as a smart phone, a tablet computer, a Personal Digital Assistant (PDA). As shown in FIG. 1, the method 100 for presenting tasks includes the following steps.

In step S101, an active index of each of tasks, which are currently in operation in the terminal, is acquired.

In the present embodiment, when a user of the terminal wants to check all the tasks currently in operation in the terminal, the user can input a task presenting instruction. The task presenting instruction can be a press on a HOME button for a predetermined time, or double clicks on a HOME button. The way the task presenting instruction is input into the terminal is not limited by these examples.

After the terminal receives the task presenting instruction, the terminal can acquire an active index of each of the tasks, which are currently in operation. An active index of a task may be a measurement of how the user operates the task. In one embodiment, the active index can be a frequency of the task being started. For example, after the terminal is turned on, active indices of all tasks are set to a default value, such as zero (0). The terminal can store names of tasks and their corresponding active indices. When it is detected that a task is started, the active index of the task is increased by one (1), to update the active index of the task. The terminal is configured to further store the updated active index of the task. The terminal can also reset the active index of the task to the default value when the operation system of the terminal is restarted.

In the present embodiment, after the terminal receives the task presenting instruction, the terminal can acquire an active index of each of the tasks that are currently in operation based on the stored data of names of tasks and their corresponding active indices. However, one skilled in the art will now appreciate that the active indices can be set through other manners. For example, an active index can be a frequency of the task being started. For example, when the terminal detects a task is started, the terminal can calculate a frequency of the task being started based on the number of times of the task being started, so as to update the active index of the task, and store the updated active index of the task.

In the present embodiment, the tasks are generally applications installed in the terminal. For example, the tasks can include an address book application or a notebook application installed in the terminal. The tasks can also include various other Applications (APP) installed in the terminals, such as Sina microblogging, We Chat, Alipay Wallet, etc.

In step S102, the tasks, which are currently in operation, are ranked based on the acquired active indices.

Based on the step S101, after the terminal acquires the active index of each of the tasks, which are currently in operation, the terminal can rank the tasks based on their active indices. For example, the tasks can be ranked according to an order from the highest active index to the lowest active index, or can be ranked according to the active indices combined with their start times. The present disclosure is not limited to these examples.

In step S103, the tasks, which are currently in operation, are presented according to the ranking result.

In the illustrated embodiment, after the terminal receives a task presenting instruction, tasks which are currently in operation can be ranked based on the active indices of the tasks, and presented according to the ranking result. The usage of the tasks can be presented with high accuracy so as to improve user experience.

Figure 2:
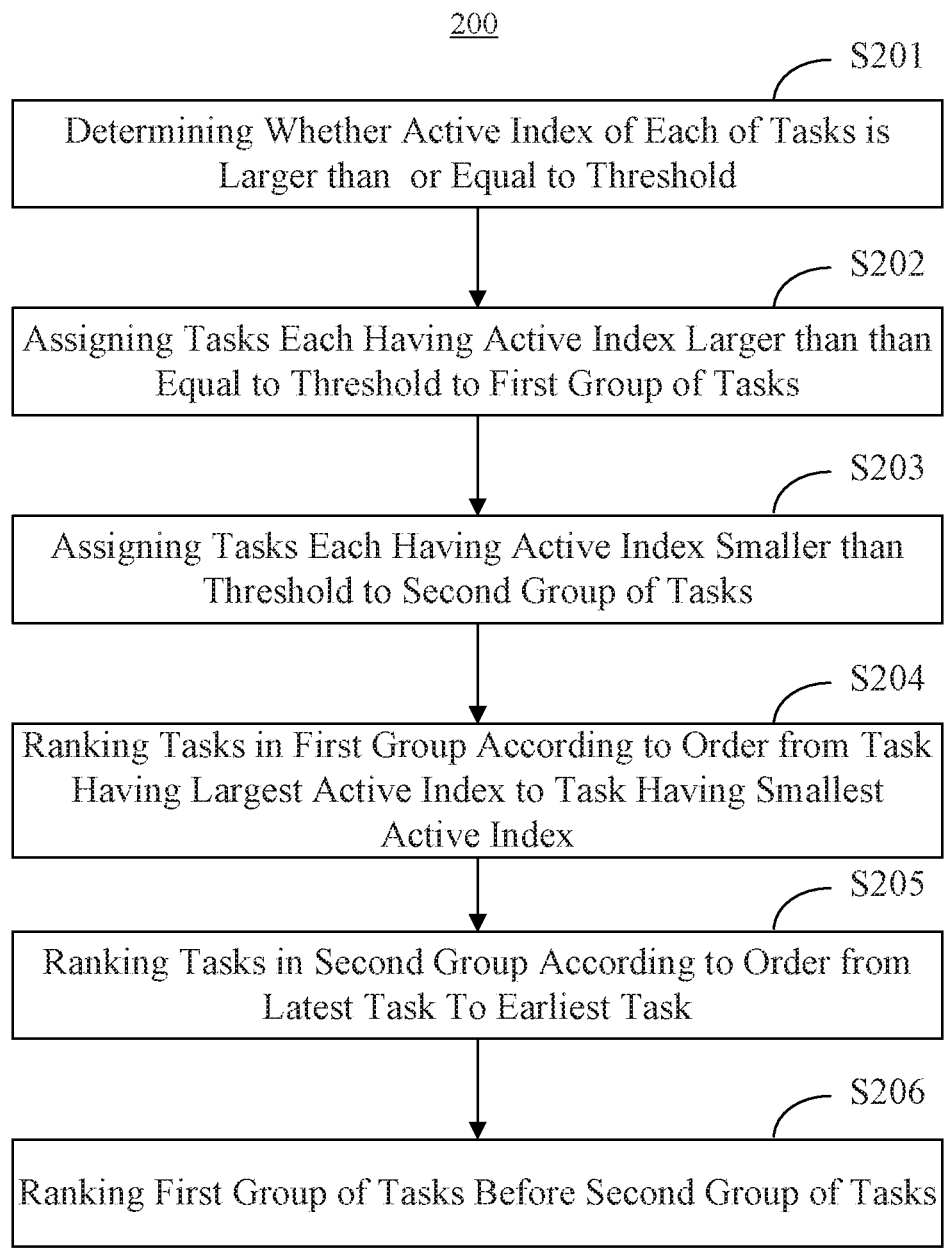
FIG. 2 is a flow chart illustrating a method for ranking tasks according to an exemplary embodiment of the present disclosure.

FIG. 2 is a flow chart illustrating a method 200 for ranking tasks currently in operation based on active indices according to an exemplary embodiment. Method 200 can be performed by a terminal.

As shown in FIG. 2, based on the above embodiment shown in FIG. 1, method 200 includes the following steps.

In step S201, the terminal determines whether the active index of each of the tasks is greater than or equal to a threshold.

In the present embodiment, the threshold can be predetermined, for example, by a developer or the user of the terminal. A task with an active index greater than or equal to the threshold is generally a task frequently operated in the terminal, and a task with an active index smaller the threshold is generally a task less frequently operated in the terminal.

In step S202, the terminal assigns the tasks having an active index larger than or equal to the threshold to a first group of tasks.

In step S203, the terminal assigns the tasks having an active index smaller than the threshold to a second group of tasks.

In the present embodiment, after the terminal acquires the active indices of the tasks which are currently in operation, the terminal can determine whether each of the active indices is larger than or equal to the threshold. The tasks that are currently operated in the terminal can be divided into two groups: a first group including tasks having an active index larger than or equal to the threshold and a second group including tasks having an active index smaller than the threshold. It can be understood that, the number of the tasks in the first group and in the second group is a natural number larger than or equal to zero (0).

In step S204, the tasks in the first group are ranked according to an order of from a task having the largest active index to a task having the smallest active index.

Based on the step S202, when the number of the tasks in the first group is larger than one (1), the terminal ranks the tasks in the first group according to their active indices from the largest to the smallest. It can be understood that, if the number of the tasks in the first group is one, it is not necessary to rank the tasks in the first group. If the number of the tasks in the first group is zero, step S204 can be skipped.

In step S205, the tasks in the second group are ranked according to an order from the task that is started the latest to the task that is started the earliest.

Based on the step S203, when the number of the tasks in the second group is larger than one, the terminal ranks the tasks in the second group in which each task has an active index less than the threshold according to the times when they are started. In the illustrated embodiment, in the second group, a task started later is ranked higher than a task started earlier. It can be understood that, if the number of the tasks in the second group is one, it is not necessary to rank the tasks in the second group. If the number of the tasks in the second group is zero, the step S205 can be skipped.

In step 206, the first group of tasks is ranked before the second group of tasks.

In one embodiment, depending on a predetermined presenting direction, the first group of tasks can be presented before the second group of tasks. For example, when a user is viewing a screen of the terminal, which presents the tasks in a horizontal direction, the first group can be arranged on the left side of the second group. That is, the first group is arranged and presented before the second group. If the terminal presents the tasks in a vertical direction, the first group can be arranged on an upper side of the second group. That is, the first group is arranged and presented before the second group.

In some embodiments, the order in which the steps S202 and S203 are performed is not limited. For example, the step S203 can be performed before the step S202. Further, the order in which the steps S204 and S205 are performed is not limited. In some embodiments, the step S205 can be performed before the step S204 is performed.

In one embodiment, six tasks are currently operated in the terminal. Each of the tasks has an active index, as shown in Table 1, where start times of the tasks are: M1 earlier than M2, M2 earlier than M3, M3 earlier than M4, M4 earlier than M5, and M5 earlier than M6.

TABLE 1

| Task | Active Index |
|------|--------------|
| M1 | 2 |
| M2 | 4 |
| M3 | 16 |
| M4 | 28 |
| M5 | 7 |
| M6 | 12 |

Figure 3:
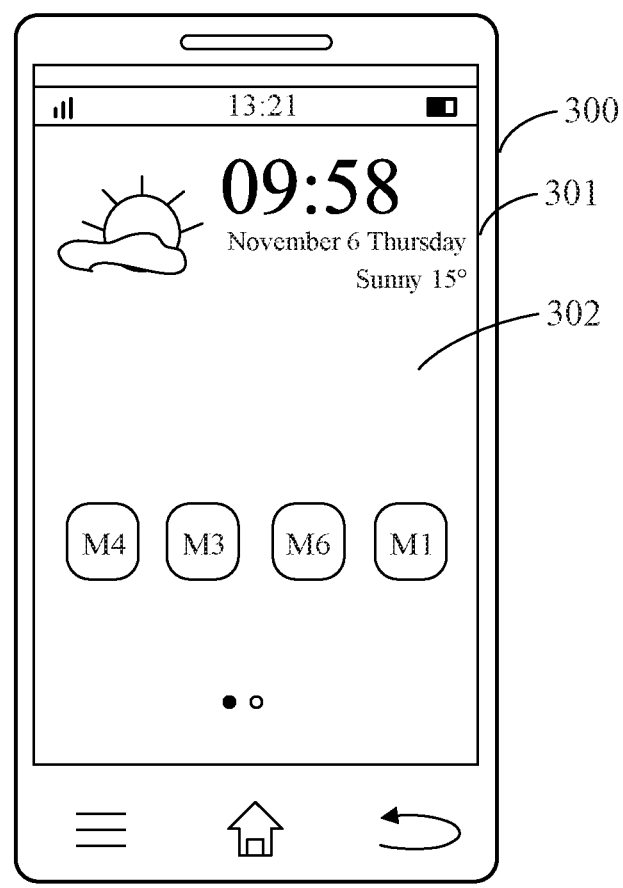
FIG. 3 illustrates a terminal having a screen presenting a first page according to an exemplary embodiment of the present disclosure.

In one embodiment, the predetermined threshold is 10. Based on the active indices of the six tasks, three tasks, M3, M4 and M6, can be assigned to the first group of tasks, and three tasks, M1, M2 and M5, can be assigned to the second group of tasks. The three tasks in the first group can be ranked according to their active indices from high to low as: M4, M3, and M6. The three tasks in the second group can be ranked according to their start times from the earliest to the latest as: M1, M2 and M5. The terminal presents the first group of tasks before the second group of tasks. The presenting order of the six tasks is: M4, M3, M6, M1, M2, and M5. FIG. 3 illustrates a terminal 300 having a screen 301 presenting a page 302. The tasks M4, M3, M6 and M1 are presented in the page 302 from left to right, and the tasks M2 and M5 are in a hidden page. The tasks M2 and M5 can be checked by the user sliding on the screen 301 to flip the page.

In the illustrated embodiment, the terminal can rank tasks currently in operation based on two conditions: start times and active indices of the tasks. Thereby, the tasks can be presented with more accuracy to improve user experience.

Figure 4:
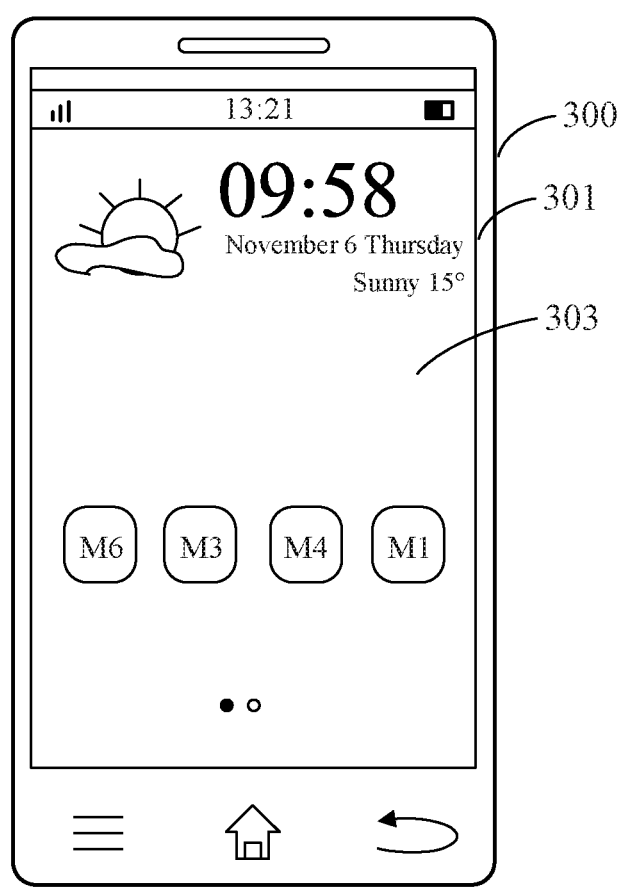
FIG. 4 illustrates the terminal having the screen presenting a second page according to an exemplary embodiment of the present disclosure.

In some embodiments, the terminal can rank the tasks in the first group according to an order of the tasks from being started the latest to the earliest. Referring to Table 1 again, if the task M4 is started earlier than the task M3, and the task M3 is started earlier than the task M6, the three tasks in the first group can be ranked according to their start times as: M6, M3, and M4. The terminal arranges and presents the first group of tasks before the second group of tasks. A different arrangement of the six tasks can be obtained as: M6, M3, M4, M1, M2 and M5. FIG. 4 illustrates the terminal 300 having the screen 301 presenting a page 303. Referring to the task presenting page 303 in FIG. 4, the tasks M6, M3, M4 and M1 are presented in the page 303 from left to right, and the tasks M2 and M5 are in a hidden page. The tasks M2 and M5 can be checked by the user sliding on the screen 301 to flip the page.

Figure 5:
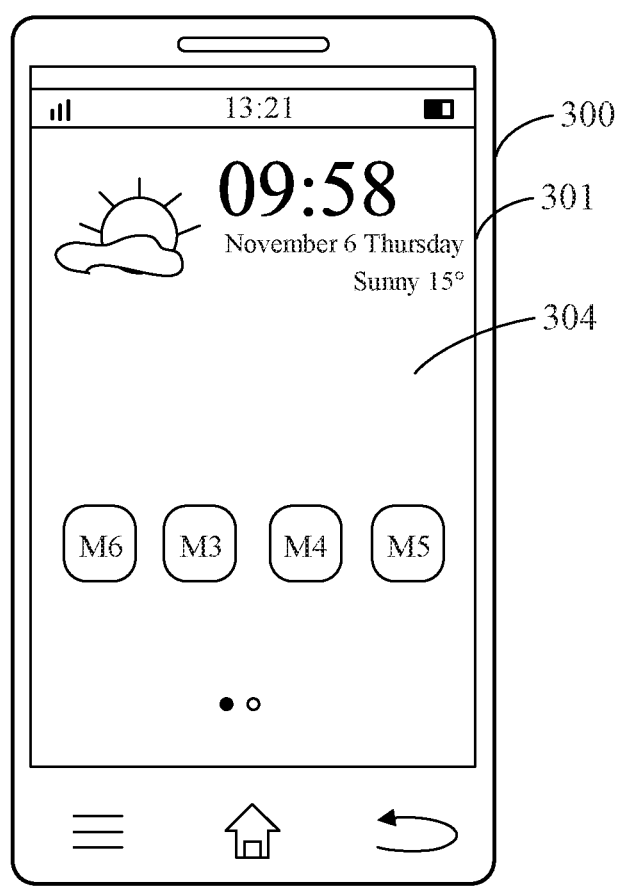
FIG. 5 illustrates the terminal having the screen presenting a third page according to an exemplary embodiment of the present disclosure.

In another embodiment of the present disclosure, the terminal can rank the tasks in the first group tasks according to an order of the tasks from being started the latest to the earliest, and can rank the tasks in the second group according to their active indices from high to low. Referring to Table 1 if the task M4 is started earlier than the task M3, and the task M3 is started earlier than the task M6, then the three tasks in the first group can be arranged according to a their start times as: M6, M3, and M4. The three tasks in the second group can be arranged according to their active indices as: M5, M2, and M1. A different arrangement of the six tasks can be obtained as: M6, M3, M4, M5, M2, and M1. FIG. 5 illustrates the terminal 300 having the screen 301 presenting a page 304. Referring to the task presenting page 304 in FIG. 5, the tasks M6, M3, M4, and M5 are presented in the page 304 from left to right, and the tasks M2 and M1 are in a hidden page. The tasks M2 and M1 can be checked by the user sliding on the screen 301 to flip the page.

Figure 6:
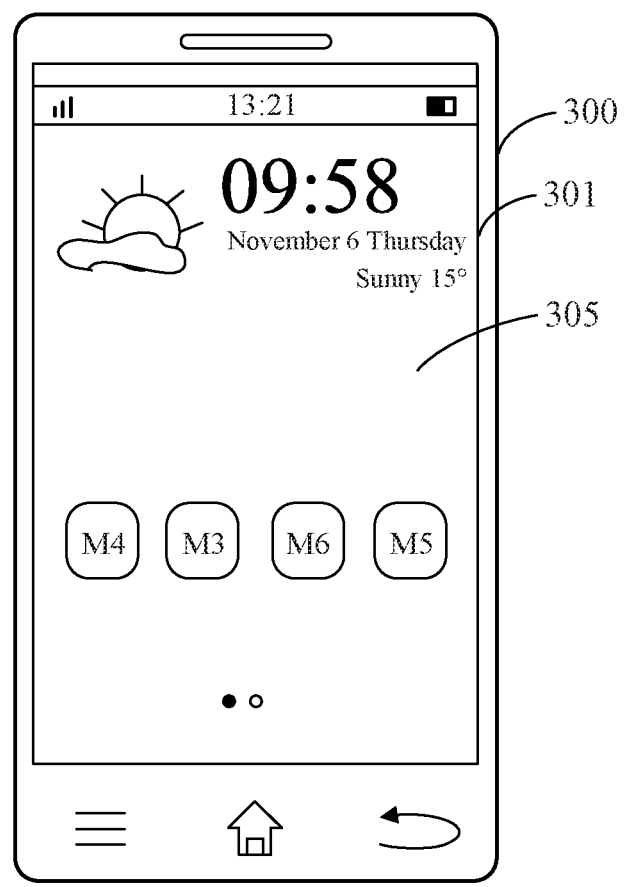
FIG. 6 illustrates the terminal having the screen presenting a fourth page according to an exemplary embodiment of the present disclosure.

In another embodiment of the present disclosure, the tasks which are currently in operation can be ranked according to their active indices from high to low. Referring to Table 1, a different arrangement of the six tasks can be obtained as: M4, M3, M6, M5, M2, and M1. FIG. 6 illustrates the terminal 300 having the screen 301 presenting a page 305. Referring to the task presenting page 305 in FIG. 6, the tasks M4, M3, M6, and M5 are presented in the page 305 from left to right, and the tasks M2 and M1 are in a hidden page. The tasks M2 and M1 can be checked by the user sliding on the screen 301 to flip the page.

The present disclosure also provides devices for presenting tasks according to the following embodiments. The devices can execute the methods explained above.

Figure 7:
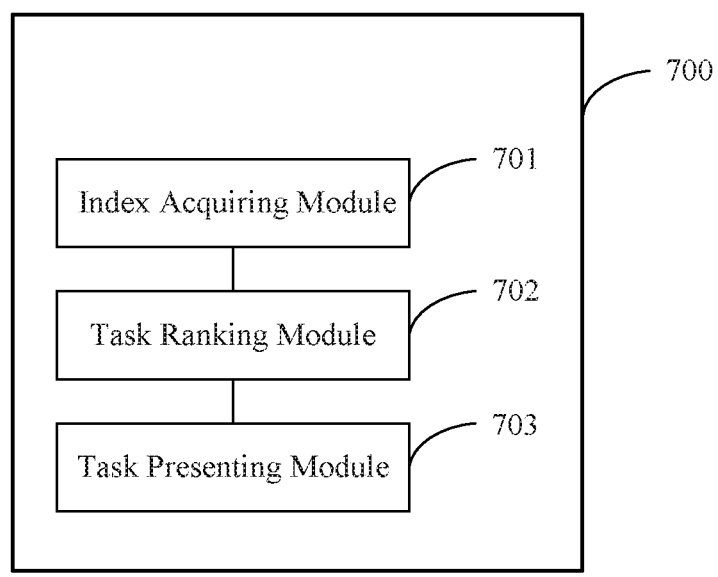
FIG. 7 is a block diagram of a device for presenting tasks according to an exemplary embodiment of the present disclosure.

FIG. 7 is a block diagram of a device 700 for presenting tasks according to an exemplary embodiment. The device 700 for presenting tasks can be a terminal. As shown in FIG. 7, the device 700 includes an index acquiring module 701, a task ranking module 702, and a task presenting module 703.

The index acquiring module 701 is configured to acquire an active index of each of tasks that are currently in operation in the device 700.

The task ranking module 702 is configured to rank the tasks that are currently in operation based on the active indices acquired by the index acquiring module 701.

The task presenting module 703 is configured to present the tasks according to the ranking result generated by the task ranking module 702.

In some embodiments, the active index may be a frequency of the task being operated in the terminal.

In the illustrated embodiment, after the device 700 receives a task presenting instruction, the device 700 can rank multiple tasks, which are currently in operation, based on active indices of the tasks, and present the tasks based on the ranking result. Thereby, the tasks can be presented with more accuracy to improve user experience.

Figure 8:
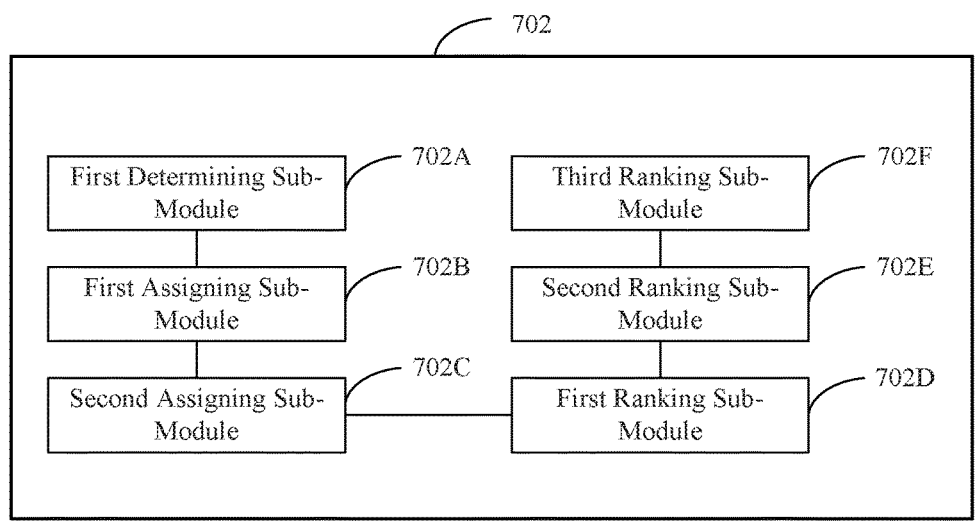
FIG. 8 is a block diagram illustrating an exemplary configuration of a task ranking module shown in FIG. 7 according to an exemplary embodiment of the present disclosure.

FIG. 8 is a block diagram illustrating an exemplary configuration of the task ranking module 702 shown in FIG. 7 according to an exemplary embodiment of the present disclosure.

As shown in FIG. 8, the task ranking module 702 includes: a first determining sub-module 702A, a first assigning sub-module 702B, a second assigning sub-module 702C, a first ranking sub-module 702D, a second ranking sub-module 702E, and a third ranking sub-module 702F.

The first determining sub-module 702A is configured to determine whether the active index of each of the tasks which is acquired by the index acquiring module 701 is larger than or equal to a threshold.

The first assigning sub-module 702B is configured to assign tasks each having an active index larger than or equal to the threshold to a first group of tasks.

The second assigning sub-module 702C is configured to assign tasks each having an active index smaller than the threshold to a second group of tasks.

The first ranking sub-module 702D is configured to rank the tasks in the first group according to an order from a task having the largest active index to a task having the smallest active index.

The second ranking sub-module 702E is configured to rank the tasks in the second group according to an order from the task that is started the latest to the task that is started the earliest.

The third ranking sub-module 702F is configured to rank the first group of tasks before/higher than the second group of tasks.

In the above embodiment, the terminal can rank a first group of tasks which includes tasks each having an active index larger than or equal to a threshold according to an order from a task having the largest active index to a task having the smallest active index; rank a second group of tasks which includes tasks each having an active index smaller than the threshold according to a late-to-early order of the task start times; and rank the first group of tasks before the second group of tasks.

Figure 9:
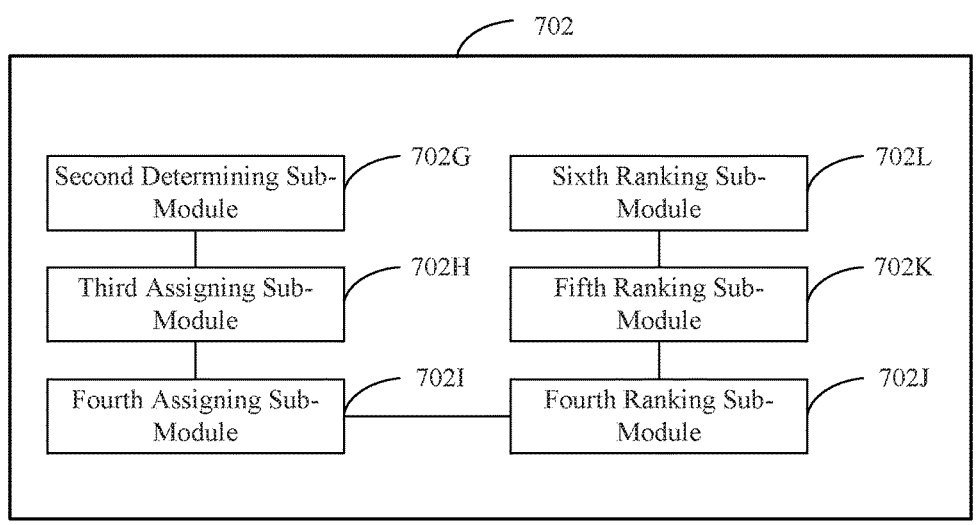
FIG. 9 is a block diagram illustrating another exemplary configuration of the task ranking module shown in FIG. 7 according to an exemplary embodiment of the present disclosure.

FIG. 9 is a block diagram illustrating another exemplary configuration of the task ranking module 702 according to an exemplary embodiment of the present disclosure.

As shown in FIG. 9, the task ranking module 702 includes: a second determining sub-module 702G, a third assigning sub-module 702H, a fourth assigning sub-module 702I, a fourth ranking sub-module 702J, a fifth ranking sub-module 702K, and a sixth ranking sub-module 702L.

The second determining sub-module 702G is configured to determine whether the active index of each of the tasks which is acquired by the index acquiring module 701 is larger than or equal to a threshold.

The third assigning sub-module 702H is configured to assign tasks each having an active index larger than or equal to the threshold to a first group of tasks.

The fourth assigning sub-module 702I is configured to assign tasks each having an active index smaller than the threshold to a second group of tasks.

The fourth ranking sub-module 702J is configured to rank the tasks in the first group according to an order from the task that is started the latest to the task that is started the earliest.

The fifth ranking sub-module 702K is configured to rank the tasks in the second group according to an order of from the task that is started the latest to the task that is started the earliest.

The sixth ranking sub-module 702L is configured to rank the first group of tasks before the second group of tasks.

Figure 10:
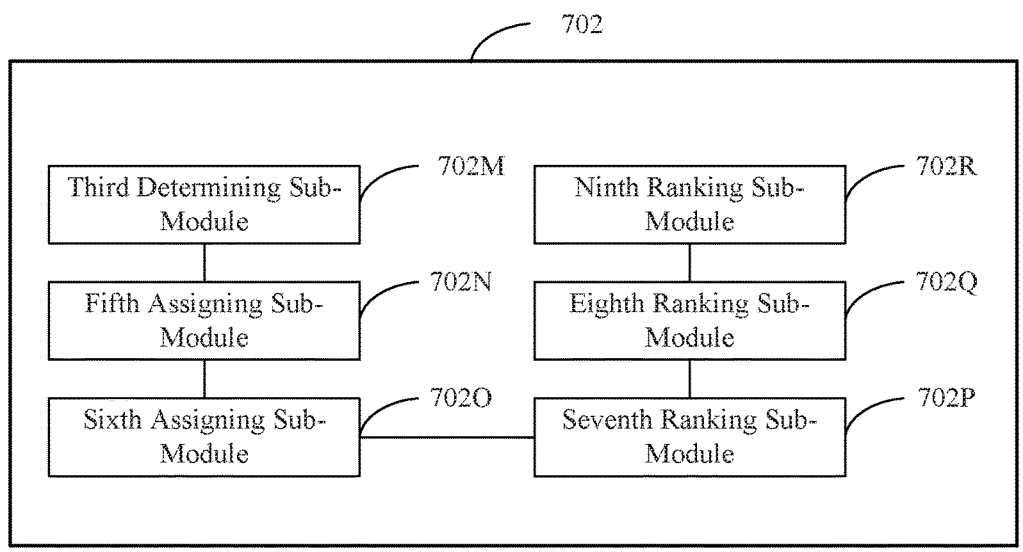
FIG. 10 is a block diagram illustrating another exemplary configuration of the task ranking module shown in FIG. 7 according to an exemplary embodiment of the present disclosure.

FIG. 10 is a block diagram illustrating another exemplary configuration of the task ranking module 702 according to an exemplary embodiment of the present disclosure.

As shown in FIG. 10, the task ranking module 702 can include: a third determining sub-module 702M, a fifth assigning sub-module 702N, a sixth assigning sub-module 702O, a seventh ranking sub-module 702P, an eighth ranking sub-module 702Q, and a ninth ranking sub-module 702R.

The third determining sub-module 702M is configured to determine whether the active index of each of the tasks which is acquired by the index acquiring module 701 is larger than or equal to a threshold.

The fifth assigning sub-module 702N is configured to assign tasks each having an active index larger than or equal to the threshold to a first group of tasks.

The sixth assigning sub-module 702O is configured to assign tasks each having an active index smaller than the threshold to a second group of tasks.

The seventh ranking sub-module 702P is configured to rank the tasks in the first group according to an order from the task that is started the latest to the task that is started the earliest.

The eighth ranking sub-module 702Q is configured to rank the tasks in the second group according to an order from a task having the largest active index to a task having the smallest active index.

The ninth ranking sub-module 702R is configured to rank the first group of tasks before the second group of tasks.

Figure 11:
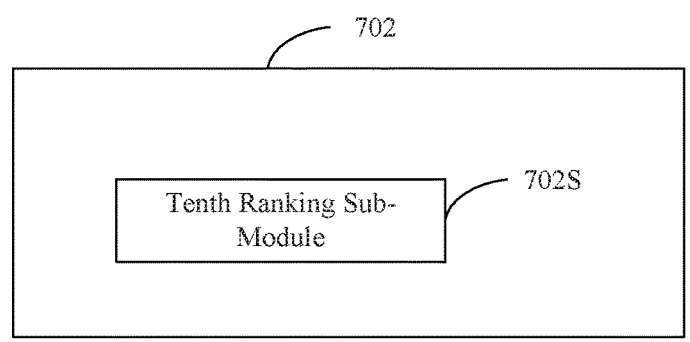
FIG. 11 is a block diagram illustrating another exemplary configuration of the task ranking module shown in FIG. 7 according to an exemplary embodiment of the present disclosure.

FIG. 11 is a block diagram illustrating another exemplary configuration of the task ranking module 702 according to an exemplary embodiment of the present disclosure.

As shown in FIG. 11, the task ranking module 702 includes a tenth ranking sub-module 702S configured to rank the tasks according to an order of from a task having the largest active index to a task having the smallest active index.

Figure 12:
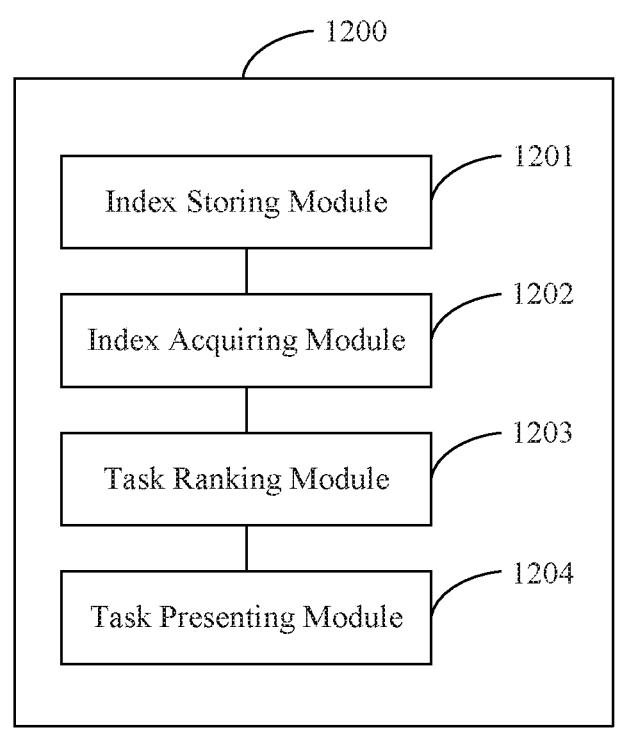
FIG. 12 is a block diagram of another device for presenting tasks according to an exemplary embodiment of the present disclosure.

FIG. 12 is a block diagram of a device 1200 for presenting tasks according to an exemplary embodiment. The device 1200 for presenting tasks can be a terminal. As shown in FIG. 12, the device 1200 includes an index storing module 1201, an index acquiring module 1202, a task ranking module 1203, and a task presenting module 1204.

The index storing module 1201 is configured to, after a task is started, update the active index of the task and store the updated active index of the task.

The index acquiring module 1202, the task ranking module 1203, and the task presenting module 1204 are similar to the index acquiring module 701, the task ranking module 702, and the task presenting module 703 shown in FIG. 7 respectively, so that the details of their functions are omitted for brevity.

The devices shown in FIGS. 7-12 are configured to perform the methods shown in FIGS. 1 and 2. Implementation of the functions and operations of the modules and sub-modules in the above devices can be referred to the implementation of the corresponding steps in the above methods, which will not be repeated herein.

The devices described above are merely illustrative. The modules or sub-modules described as separate may be or may not be physically separate and may be at the same location, or may be distributed to multiple units over a network. A part of or all of the modules can be selected to perform various functions as desired.

Correspondingly, the present disclosure also provides a device for presenting tasks, including: a processor, and a memory for storing instructions executable by the processor. The processor is configured to perform the methods explained above. In one embodiment, the method includes: acquiring an active index of each of tasks which are currently in operation; ranking the tasks based on the active indices; and presenting the tasks according to the ranking result. In one embodiment, the active index is a frequency of the task being operated in the terminal.

Correspondingly, the present disclosure also provides a non-transitory computer readable storage medium storing instructions which, when executed by a processor of a terminal, cause the terminal to perform the methods for presenting tasks explained above. In one embodiment, the method includes: acquiring an active index of each of tasks which are currently in operation; ranking the tasks based on the active indices; and presenting the tasks according to the ranking result. In one embodiment, the active index is a frequency of the task being operated in the terminal.

Figure 13:
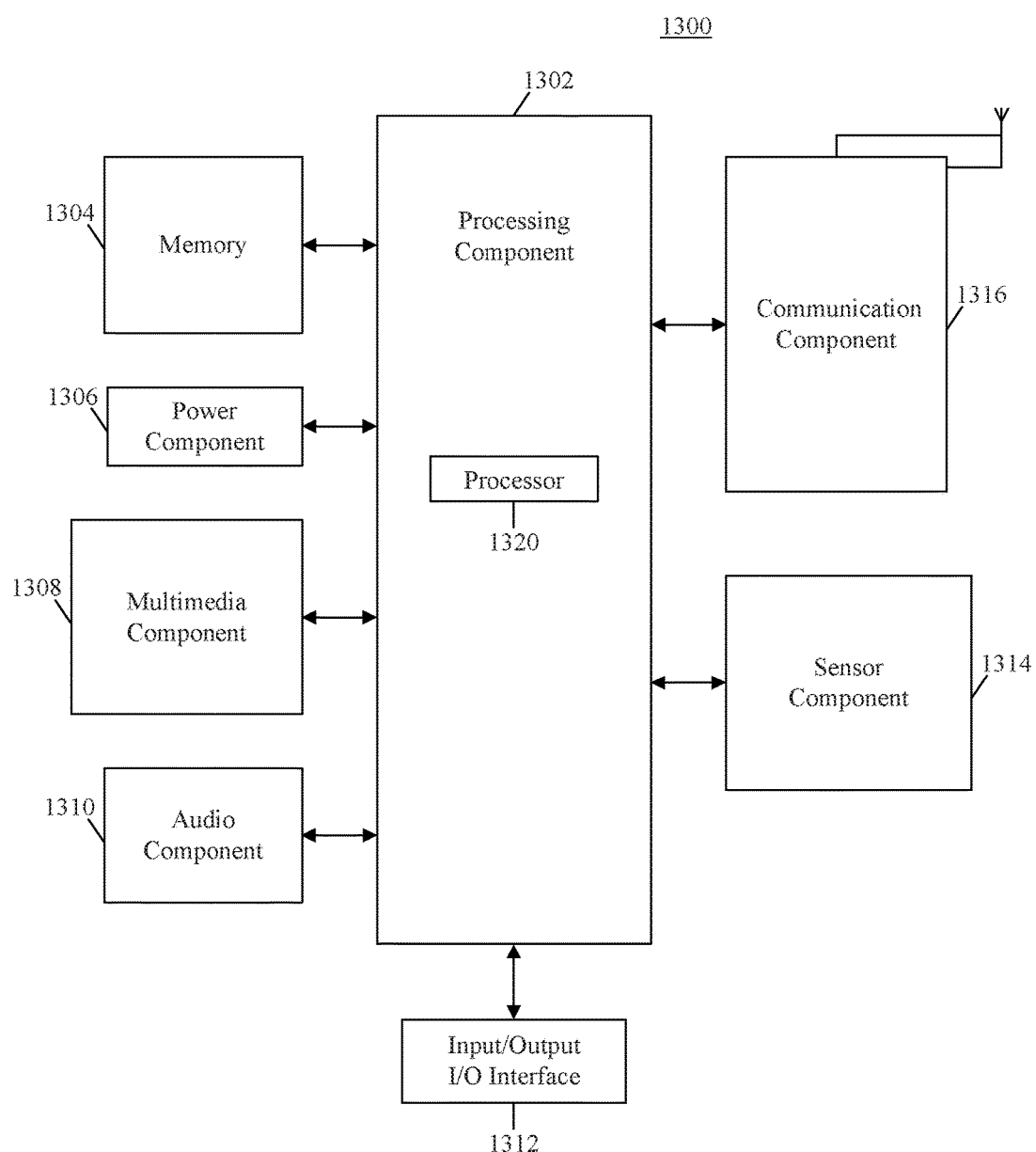
FIG. 13 is a block diagram of a device for presenting tasks according to an exemplary embodiment of the present disclosure.

FIG. 13 is a block diagram of a device 1300 for presenting tasks according to an exemplary embodiment. For example, the device 1300 can be a mobile phone, a computer, a digital broadcast terminal, a messaging device, a gaming console, a tablet, a medical device, exercise equipment, a personal digital assistant, and the like.

Referring to FIG. 13, the device 1300 can include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 typically controls overall operations of the device 1300, such as the operations associated with display, telephone calls, data communications, camera operations, and recording operations. The processing component 1302 can include one or more processors 1320 to execute instructions to perform all or part of the steps in the above described methods. Moreover, the processing component 1302 can include one or more modules which facilitate the interaction between the processing component 1302 and other components. For instance, the processing component 1302 can include a multimedia module to facilitate the interaction between the multimedia component 1308 and the processing component 1302.

The memory 1304 is configured to store various types of data to support the operation of the device 1300. Examples of such data include instructions for any applications or methods operated on the device 1300, contact data, phonebook data, messages, pictures, video, etc. The memory 1304 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the device 1300. The power component 1306 can include a power management system, one or more power sources, and any other components associated with the generation, management, and distribution of power in the device 1300.

The multimedia component 1308 includes a screen providing an output interface between the device 1300 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 1308 includes a front camera and/or a rear camera. The front camera and the rear camera can receive an external multimedia datum while the device 1300 is in an operation mode, such as a photographing mode or a video mode. Each of the front camera and the rear camera can be a fixed optical lens system or have focus and optical zoom capability.

The audio component 1310 is configured to output and/or input audio signals. For example, the audio component 1310 includes a microphone configured to receive an external audio signal when the device 1300 is in an operation mode, such as a call mode, a recording mode, and a voice recognition mode. The received audio signal can be further stored in the memory 1304 or transmitted via the communication component 1316. In some embodiments, the audio component 1310 further includes a speaker to output audio signals.

The I/O interface 1312 provides an interface between the processing component 1302 and peripheral interface modules, such as a keyboard, a click wheel, buttons, and the like. The buttons can include, but are not limited to, a home button, a volume button, a starting button, and a locking button.

The sensor component 1314 includes one or more sensors to provide status assessments of various aspects of the device 1300. For instance, the sensor component 1314 can detect an open/closed status of the device 1300, relative positioning of components, e.g., the display and the keypad, of the device 1300, a change in position of the device 1300 or a component of the device 1300, a presence or absence of user contact with the device 1300, an orientation or an acceleration/deceleration of the device 1300, and a change in temperature of the device 1300. The sensor component 1314 can include a proximity sensor configured to detect the presence of nearby objects without any physical contact. The sensor component 1314 can also include a light sensor, such as a CMOS or CCD image sensor, for use in imaging applications. In some embodiments, the sensor component 1314 can also include an accelerometer sensor, a gyroscope sensor, a magnetic sensor, a pressure sensor, or a temperature sensor.

The communication component 1316 is configured to facilitate communication, wired or wirelessly, between the device 1300 and other devices. The device 1300 can access a wireless network based on a communication standard, such as WiFi, 2G, 3G, or 4G or a combination thereof. In one exemplary embodiment, the communication component 1316 receives a broadcast signal or broadcast associated information from an external broadcast management system via a broadcast channel. In one exemplary embodiment, the communication component 1316 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the device 1300 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1304, executable by the processor 1320 in the device 1300, for performing the above-described methods. For example, the non-transitory computer-readable storage medium can be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for presenting tasks, comprising:
acquiring an active index of each of tasks which are currently in operation in a terminal;
ranking the tasks based on the active indices; and
presenting the tasks according to a result of the ranking,
wherein the active index is a frequency of the task being operated in the terminal, and
wherein the ranking the tasks based on the active indices comprises:
 determining whether the active index of each of the tasks is larger than or equal to a threshold;
 assigning tasks each having an active index larger than or equal to the threshold to a first group;
 assigning tasks each having an active index smaller than the threshold to a second group;
 ranking the tasks in the first group according to a first order;
 ranking the tasks in the second group according to a second order, at least one of the first order or the second order being based on start times of the tasks; and
 ranking the first group of tasks before the second group of tasks.

2. The method of claim 1, wherein
the first order is from a task having the largest active index to a task having the smallest active index, and
the second order is from a task started the latest to a task started the earliest.

3. The method of claim 1, wherein
the first order is from a task started the latest to a task started the earliest, and
the second order is from a task started the latest to a task started the earliest.

4. The method of claim 1, wherein
the first order is from a task started the latest to a task started the earliest, and
the second order is from a task having the largest active index to a task having the smallest active index.

5. The method of claim 1, further comprising:
after a task is started, updating the active index of the task and storing the updated active index of the task.

6. A device for presenting tasks, comprising:
a processor; and
a memory for storing instructions executable by the processor; wherein the processor is configured to perform:
acquiring an active index of each of tasks which are currently in operation in a terminal;
ranking the tasks based on the active indices; and
presenting the tasks according to a result of the ranking,
wherein the active index is a frequency of the task being operated in the terminal, and
wherein in ranking the tasks based on the active indices, the processor is configured to perform:
 determining whether the active index of each of the tasks is larger than or equal to a threshold;
 assigning tasks each having an active index larger than or equal to the threshold to a first group;
 assigning tasks each having an active index smaller than the threshold to a second group;
 ranking the tasks in the first group according to a first order;
 ranking the tasks in the second group according to a second order, at least one of the first order or the second order being based on start times of the tasks; and
 ranking the first group of tasks before the second group of tasks.

7. The device of claim 6, wherein
the first order is from a task having the largest active index to a task having the smallest active index, and
the second order is from a task started the latest to a task started the earliest.

8. The device of claim 6, wherein
the first order is from a task started the latest to a task started the earliest, and
the second order is from a task started the latest to a task started the earliest.

9. The device of claim 6, wherein
the first order is from a task started the latest to a task started the earliest, and
the second order is from a task having the largest active index to a task having the smallest active index.

10. The device for presenting tasks of claim 6, wherein the processor is further configured to perform:
after a task is started, updating the active index of the task and storing the updated active index of the task.

11. A non-transitory computer-readable storage medium having stored therein instructions that, when executed by a processor of a terminal, cause the terminal to perform:
acquiring an active index of each of tasks which are currently in operation in a terminal;
ranking the tasks based on the active indices; and
presenting the tasks according to a result of the ranking,
wherein the active index is a frequency of the task being operated in the terminal, and
wherein the ranking the tasks based on the active indices comprises:
 determining whether the active index of each of the tasks is larger than or equal to a threshold;
 assigning tasks each having an active index larger than or equal to the threshold to a first group;
 assigning tasks each having an active index smaller than the threshold to a second group;
 ranking the tasks in the first group according to a first order;
 ranking the tasks in the second group according to a second order, at least one of the first order or the second order being based on start times of the tasks; and
 ranking the first group of tasks before the second group of tasks.

12. The non-transitory computer-readable storage medium of claim 11, wherein
the first order is from a task having the largest active index to a task having the smallest active index, and
the second order from a task started the latest to a task started the earliest.

13. The non-transitory computer-readable storage medium of claim 11, wherein
the first order is from a task started the latest to a task started the earliest, and
the second order is from a task started the latest to a task started the earliest.

14. The non-transitory computer-readable storage medium of claim 11, wherein
the first order is from a task started the latest to a task started the earliest, and the second order is from a task having the largest active index to a task having the smallest active index.

15. The non-transitory computer-readable storage medium for presenting tasks of claim 11, wherein the instructions further cause the terminal to perform:
after a task is started, updating the active index of the task and storing the updated active index of the task.

* * * * *